United States Patent
Uchiyama et al.

(10) Patent No.: US 9,488,835 B2
(45) Date of Patent: Nov. 8, 2016

(54) VIRTUAL IMAGE DISPLAY DEVICE AND ATTACHMENT DEVICE

(71) Applicant: PIONEER CORPORATION, Kanagawa (JP)

(72) Inventors: Tetsuya Uchiyama, Saitama (JP); Takashi Iizawa, Saitama (JP); Akira Yasaki, Saitama (JP); Yasuhiro Shinkai, Saitama (JP); Takashi Mizoguchi, Saitama (JP); Ryosuke Shimosawa, Saitama (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/914,404

(22) PCT Filed: Aug. 29, 2013

(86) PCT No.: PCT/JP2013/073191
§ 371 (c)(1),
(2) Date: Feb. 25, 2016

(87) PCT Pub. No.: WO2015/029192
PCT Pub. Date: Mar. 5, 2015

(65) Prior Publication Data
US 2016/0216513 A1    Jul. 28, 2016

(51) Int. Cl.
*G02B 27/14* (2006.01)
*G09G 5/00* (2006.01)
(Continued)

(52) U.S. Cl.
CPC ........... *G02B 27/0149* (2013.01); *B60K 35/00* (2013.01); *B60R 1/00* (2013.01);
(Continued)

(58) Field of Classification Search
CPC ............ B60K 35/00; B60K 2350/922; B60K 2350/927; B60R 1/00; B60R 11/0229; B60R 11/0235; B60R 2011/008; B60R 2300/205; G02B 27/01; G02B 27/0101; G02B 27/0149; G02B 27/0159; G02B 27/0161; G02B 2027/0118; G02B 2027/0127; G02B 2027/0169; G02B 2027/013; G02B 2027/0172; B60J 3/00; B60J 3/0239; B60J 3/0252; B60J 3/0265
USPC ................ 359/602, 630, 631, 633; 345/7–9; 296/97.1, 97.9, 97.11, 97.13
See application file for complete search history.

(56) References Cited

U.S. PATENT DOCUMENTS

| 8,845,000 | B2 * | 9/2014 | Asai | ....................... B60J 3/0265 296/97.11 |
| 8,931,822 | B2 * | 1/2015 | Asai | ....................... B60J 3/0239 296/97.1 |

(Continued)

FOREIGN PATENT DOCUMENTS

| JP | 99-39567 | 2/1997 |
| JP | 2004-155316 | 6/2004 |

(Continued)

OTHER PUBLICATIONS

International Search Report, PCT/JP2013,073191, Oct. 29, 2013.

*Primary Examiner* — Loha Ben
(74) *Attorney, Agent, or Firm* — Young & Thompson

(57) ABSTRACT

A head-up display makes an observer visually recognize an image, which is optically reflected by a combiner, as a virtual image. The head-up display has a main body unit and an attaching unit. The main unit has a light source which is a projection unit for projecting the image. The attachment unit is configured such that the attachment unit can be attached to a sun visor that is provided to a vehicle. The joint member has a rotation shaft that rotatably joints the main unit to the attachment unit. The damper reduces vibration of the main unit in the rotational direction of the rotation shaft. When the rotation shaft of the joint member is attached to the sun visor by the attachment unit, the rotation shaft is substantially parallel to a sun visor supporting shaft so the sun visor can rotate in the direction in which the sun visor opens/closes.

12 Claims, 12 Drawing Sheets

(51) Int. Cl.
*G02B 27/01* (2006.01)
*B60R 11/02* (2006.01)
*B60K 35/00* (2006.01)
*B60R 1/00* (2006.01)
*B60J 3/02* (2006.01)

(52) U.S. Cl.
CPC ...... *B60R 11/0229* (2013.01); *B60R 11/0235* (2013.01); *G02B 27/0101* (2013.01); *B60J 3/0239* (2013.01); *B60J 3/0252* (2013.01); *B60J 3/0265* (2013.01); *B60K 2350/922* (2013.01); *B60K 2350/927* (2013.01); *B60R 2300/205* (2013.01); *G02B 2027/0169* (2013.01)

(56) References Cited

U.S. PATENT DOCUMENTS 9,033,392 B2 * 5/2015 Asai .................. B60J 3/0265 296/97.9
2016/0062117 A1 * 3/2016 Imasaka ............ G02B 27/0101 345/7

FOREIGN PATENT DOCUMENTS

| JP | 2007-290487 | 11/2007 |
| JP | 2012-071825 | 4/2012 |
| JP | 4945702 | 6/2012 |

* cited by examiner

VIRTUAL IMAGE DISPLAY DEVICE AND ATTACHMENT DEVICE

TECHNICAL FIELD

The present invention relates to a technology of vibration suppression of display.

BACKGROUND TECHNIQUE

Conventionally, there is known a head-up display which is attachable in a vehicle. For example, Patent Reference-1 discloses a head-up display capable of being installed on the ceiling board of a vehicle.

Patent Reference-1: Japanese Patent Application Laid-open under No. 2012-071825

DISCLOSURE OF INVENTION

Problem to be Solved by the Invention

In such a configuration that a head-up display is attached to a sun visor, at the time when the vehicle vibrates depending on the condition of the running road surface, the sun visor and the vehicle body vibrate in different ways due to their own inertia and other causes. Specifically, a sun visor tends to vibrate in the pitch direction (i.e., direction in which the sun visor opens/closes) of the vehicle with respect to the vehicle body. In contrast, since a head-up display displays a virtual image to be seen in the distance, even a minor angle change to the pitch direction of the vehicle could cause a great change of the position of the virtual image. Thus, when the head-up display vibrates in the pitch direction of the vehicle along with the sun visor, the virtual image also vibrates. It leads to deterioration of the visibility of the virtual image. In contrast, Patent Reference-1 does not disclose anything about measures against the vibration at the time when the vehicle is running.

The above is an example of the problem to be solved by the present invention. An object of the present invention is to provide a virtual image display device and an attachment device capable of preferably suppressing influence caused by vibration of a moving body.

Means for Solving the Problem

One invention is a virtual image display device configured to make an observer visually recognize a display image as a virtual image, the display image being optically reflected by a half mirror, the virtual image display device including: a main unit configured to include a projection unit for projecting the display image; an attachment member configured to be attachable to a sun visor installed in a moving body; a joint member configured to include a joint shaft which rotatably joints the main unit to the attachment member; and a buffer member configured to reduce vibration of the main unit in rotational direction of the joint shaft, wherein the joint shaft of the joint member is substantially parallel to a sun visor shaft in a state that the attachment member is attached to the sun visor, the sun visor shaft supporting the sun visor in a state that the sun visor can rotate in direction in which the sun visor opens and closes with respect to a front window of the moving body.

Another invention is an attachment device for attaching an object to a sun visor installed in a moving body, including: an attachment member configured to be attached to the sun visor of the moving body; a joint member configured to include a joint shaft which rotatably joints the object to the attachment member; and a buffer member configured to reduce vibration of the object in rotational direction of the joint shaft, wherein the joint shaft of the joint member is substantially parallel to a sun visor shaft in a state that the attachment member is attached to the sun visor, the sun visor shaft supporting the sun visor in a state that the sun visor can rotate in direction in which the sun visor opens and closes with respect to a front window of the moving body.

DETAILED DESCRIPTION OF THE PREFERRED EMBODIMENTS

Figure 1:
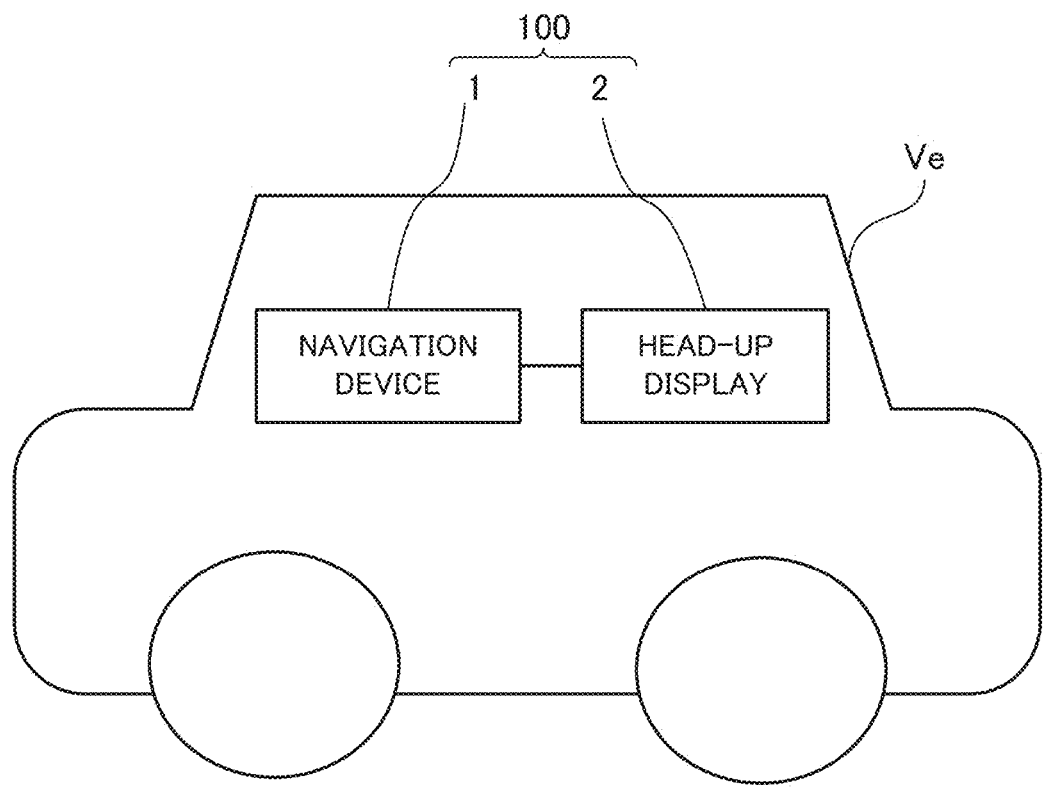
FIG. 1 illustrates an example of the configuration of a display system.

According to a preferable embodiment of the present invention, there is provided a virtual image display device configured to make an observer visually recognize a display image as a virtual image, the display image being optically reflected by a half mirror, the virtual image display device including: a main unit configured to include a projection unit for projecting the display image; an attachment member configured to be attachable to a sun visor installed in a moving body; a joint member configured to include a joint shaft which rotatably joints the main unit to the attachment member; and a buffer member configured to reduce vibration of the main unit in rotational direction of the joint shaft, wherein the joint shaft of the joint member is substantially parallel to a sun visor shaft in a state that the attachment member is attached to the sun visor, the sun visor shaft supporting the sun visor in a state that the sun visor can rotate in direction in which the sun visor opens and closes with respect to a front window of the moving body.

The above virtual image display device is configured to make an observer visually recognize an image, which is optically reflected by a half mirror, as a virtual image. The virtual image display device includes a main unit and an attachment member. The term "half mirror" herein indicates what reflects a part of incident light and lets the other part of the incident light pass, and the strength of the reflection light and the strength of the passing light do not have to be the same strength. The main unit includes a projection unit for projecting the image. An attachment member is configured to be attachable to a sun visor installed in a moving body. A joint member is configured to include a joint shaft which rotatably joints the main unit to the attachment member. A buffer member is configured to reduce vibration of the main unit in rotational direction of the joint shaft. The joint shaft of the joint member is substantially parallel to a sun visor shaft in a state that the attachment member is attached to the sun visor, wherein the sun visor shaft supports the sun visor in a state that the sun visor can rotate in direction in which the sun visor opens and closes with respect to a front window of the moving body.

In this mode, the joint shaft of the joint member is substantially parallel to the sun visor shaft, and the buffer member is configured to reduce the vibration of the main unit in rotational direction of the joint shaft. Thereby, the virtual image display device preferably suppresses the main unit from vibrating along with the sun visor in the pitch direction of the moving body due to the vibration of the moving body. Thus, the virtual image display device can preferably reduce the vibration of the virtual image due to the vibration of the moving body.

In one mode of the virtual image display device, the joint shaft exists near the sun visor shaft. According to this mode, the virtual image display device keeps as low as possible the torque of the sun visor around the sun visor shaft generated by the weight of the main unit. Thereby, it is possible to preferably suppress the vibration of the sun visor in the pitch direction of the moving body.

In another mode of the virtual image display device, the center of gravity of the main unit exists near the joint shaft. According to this mode, the virtual image display device keeps as low as possible the torque of the main unit around the joint shaft generated by the weight of the main unit. Thereby, it is possible to preferably suppress the vibration of the main unit with respect to the sun visor in the pitch direction of the moving body.

In still another mode of the virtual image display device, the joint shaft exists in a substantially vertical direction with respect to the sun visor shaft and the center of gravity of the main unit exists in a substantially vertical direction with respect to the joint shaft. According to this mode, the virtual image display device keeps as low as possible both the torque of the sun visor around the sun visor shaft generated by the weight of the main unit and the torque of the main unit around the joint shaft generated by the weight of the main unit. Thereby, it is possible to preferably suppress the vibration of the main unit in the pitch direction of the moving body.

In still another mode of the virtual image display device, the attachment member sandwiches the sun visor in order to be attached thereto, and width of the attachment member sandwiching the sun visor in a longitudinal direction of the sun visor is determined to such a length that resonance frequency of the sun visor is equal to or higher than a predetermined frequency. The above term "predetermined frequency" herein indicates a lower limit of resonance frequencies of the sun visor in which the amplitude of the vibration of the virtual image is within a tolerable range, and is determined through experimental trials, for example. According to this mode, the virtual image display device can raise the resonance frequency of the sun visor by reinforcing the stiffness of the sun visor to suppress the virtual image from fluctuating.

In still another mode of the virtual image display device, the virtual image display device further includes a restriction member configured to restrict the sun visor from rotating on the sun visor shaft in a state that the sun visor is closed. According to this mode, the virtual image display device can suppress the sun visor from vibrating in the pitch direction of the moving body thereby to preferably suppress the virtual image from fluctuating.

In still another mode of the virtual image display device, the restriction member is provided between the attachment member and a target unit of attachment installed in the moving body, and the restriction member is an arm which sticks out with respect to the sun visor shaft to direction of the front window along the target unit. According to this mode, the arm can preferably restrict the sun visor from rotating on the sun visor shaft.

In still another mode of the virtual image display device, the arm is rotatable or extendable along the target unit not to stick out with respect to the sun visor shaft to the direction of the front window. According to this mode, it is possible to preferably use the sun visor.

In still another mode of the virtual image display device, the virtual image display device further includes a combiner configured to function as the half mirror. According to this mode, the virtual image display device can make the observer visually recognize the virtual image.

According to still another preferable embodiment of the present invention, there is provided an attachment device for attaching an object to a sun visor installed in a moving body, including: an attachment member configured to be attached to the sun visor of the moving body; a joint member configured to include a joint shaft which rotatably joints the object to the attachment member; and a buffer member configured to reduce vibration of the object in rotational direction of the joint shaft, wherein the joint shaft of the joint member is substantially parallel to a sun visor shaft in a state that the attachment member is attached to the sun visor, the sun visor shaft supporting the sun visor in a state that the sun visor can rotate in direction in which the sun visor opens and closes with respect to a front window of the moving body. According to this mode, when attaching the object to the sun visor, the attachment device can suppress the object from vibrating along with the sun visor in the pitch direction of the moving body due to the vibration of the moving body.

Embodiment

Now, a preferred embodiment of the present invention will be described below with reference to the attached drawings. Hereinafter, the term "rotation" is applied to not only a case that the rotational direction is in the clockwise direction but also a case that the rotational direction is in the anticlockwise direction. The term "rotation" is also applied to a case that the rotatable range (angle) is limited.

[Basic Configuration]

First, with reference to FIGS. 1 to 5, a description will be given of the basic configuration according to the embodiment.

(1) System Configuration

FIG. 1 illustrates an example of the configuration of a display system 100 according to the embodiment. As illustrated in FIG. 1, the display system 100 is mounted on a vehicle Ve and includes a navigation device 1 and a head-up display 2. It is noted that all functions of the navigation device 1 may be incorporated into the head-up display 2 instead of the configuration illustrated in FIG. 1.

The navigation device 1 has a guide function of a route from a departure place to a destination. Examples of the navigation device 1 include a stationary navigation device installed on a vehicle, a PND (Portable Navigation Device) and a cell phone such as a smart phone.

The head-up display 2 generates an image (referred to as "guide image") indicating guide information for assisting the driving operation such as map information indicating the present position, route guide information and a running speed, and lets the driver visually recognize the guide image as a virtual image from the position of the eye (eye point) of the driver. The navigation device 1 supplies the head-up display 2 with various kinds of information used for the navigation processing such as the position of the vehicle Ve, the running speed of the vehicle Ve, map information and facility data.

It is noted that the navigation device 1 may be held by a cradle if the navigation device 1 is a cell phone such as a smart phone. In this case, the navigation device 1 may exchange the information with the head-up display 2 via the cradle.

(2) Configuration of Navigation Device

Figure 2:
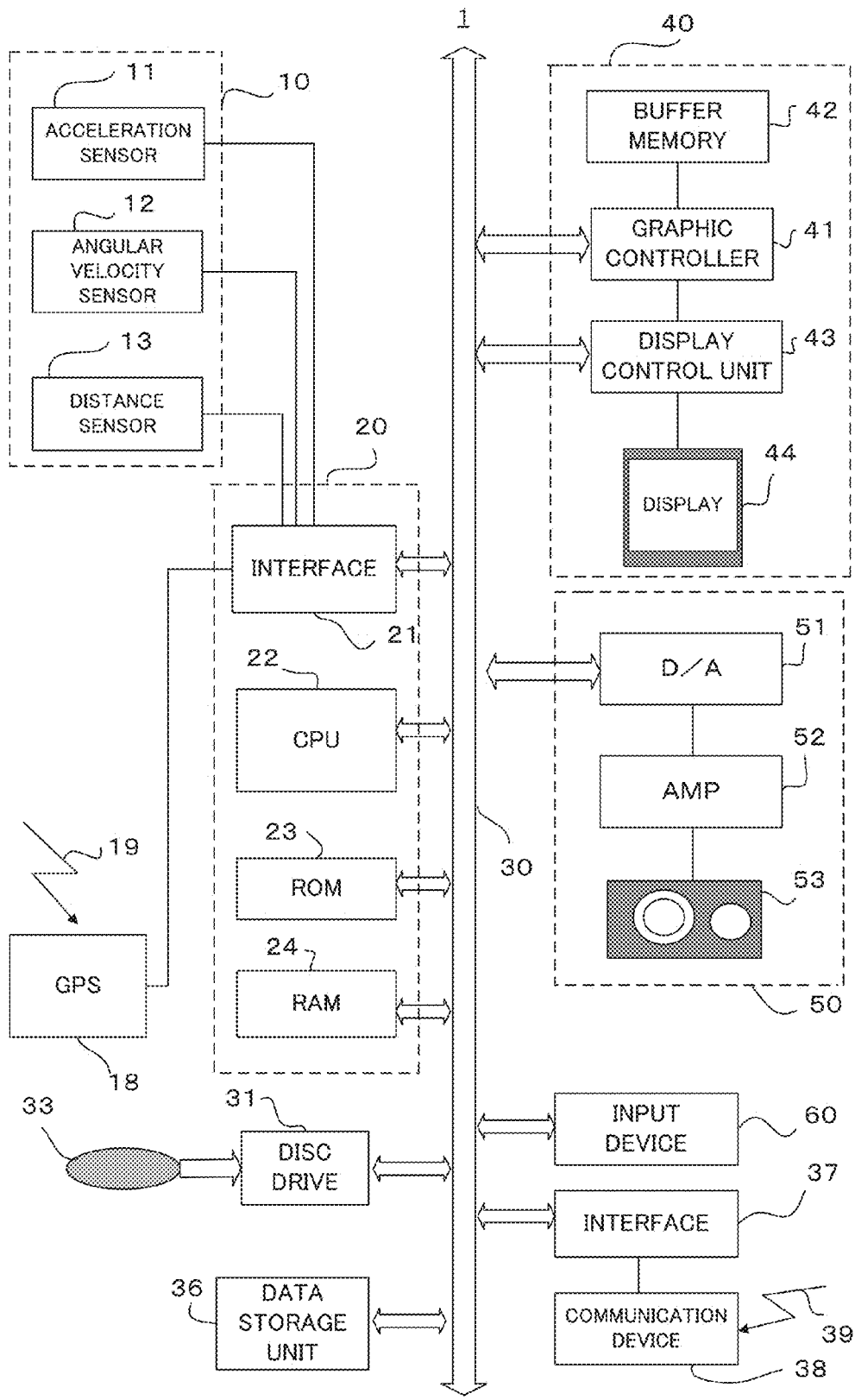
FIG. 2 illustrates a device configuration of a navigation device.

FIG. 2 illustrates a device configuration of the navigation device 1. As shown in FIG. 2, the navigation device 1 includes a stand-alone position measurement device 10, a GPS receiver 18, a system controller 20, a disc drive 31, a data storage unit 36, a communication interface 37, a communication device 38, a display unit 40, a sound output unit 50, and an input device 60.

The stand-alone position measurement device 10 includes an acceleration sensor 11, an angular velocity sensor 12 and a distance sensor 13. The acceleration sensor 11 includes a piezoelectric element, for example, and detects the acceleration degree of the vehicle Ve and outputs the acceleration data. The angular velocity sensor 12 includes a vibration gyroscope, for example, and detects the angular velocity of the vehicle Ve at the time of changing the direction of the vehicle Ve and outputs the angular velocity data and the relative direction data. The distance sensor 13 measures vehicle speed pulses including a pulse signal generated with the wheel rotation of the vehicle Ve.

The GPS receiver 18 receives an electric wave 19 for transmitting downlink data including position measurement data from plural GPS satellites, which is used for detecting the absolute position (hereinafter referred to as "present position") of the vehicle from longitude and latitude information.

The system controller 20 includes an interface 21, a CPU (Center Processing Unit) 22, a ROM (Read Only Memory) 23 and a RAM (Random Access Memory) 24, and is configured to control the entire navigation device 1.

The interface 21 executes the interface operation with the acceleration sensor 11, the angular velocity sensor 12, the distance sensor 13 and the GPS receiver 18. Then, the interface 21 inputs the vehicle speed pulse, the acceleration data, the relative direction data, the angular velocity data, the GPS measurement data and the absolute direction data into the system controller 20. The CPU 22 controls the entire system controller 20. The ROM 23 includes a non-volatile memory (not shown) in which a control program for controlling the system controller 20 is stored. The RAM 24 readably stores various kinds of data such as route data preset by the user via the input device 60, and supplies a working area to the CPU 22.

The system controller 20, the disc drive 31 such as a CD-ROM drive or a DVD-ROM drive, the data storage unit 36, the communication interface 37, the display unit 40, the sound output unit 50 and the input device 60 are connected to each other via a bus line 30.

Under the control of the system controller 20, the disc drive 31 reads contents data such as sound data and video data from a disc 33 such as a CD and a DVD to output the contents data. The disc drive 31 may be the CD-ROM drive or the DVD-ROM drive, or may be a drive compatible between the CD and the DVD.

The data storage unit 36 includes a HDD, for example, and stores various kinds of data used for a navigation process such as map data. The map data includes road data and facility information on each facility. The road data is expressed by links corresponding to roads and nodes corresponding to connection parts (intersections) of roads.

The communication device 38 includes an FM tuner or a beacon receiver, a mobile phone and a dedicated communication card for example, and receives road traffic information such as traffic jam information and traffic information and other information delivered from a VICS (Vehicle Information Communication System) center via the communication interface 37. The communication device 38 sends the head-up display 2 various kinds of information used for the navigation processing such as information on the guide route determined by the system controller 20.

The display unit 40 displays various kinds of display data on a display screen of a display 44 under the control of the system controller 20. Concretely, the system controller 20 reads the map data from the data storage unit 36, and the display unit 40 displays, on its display screen, the map data read from the data storage unit 36 by the system controller 20. The display unit 40 includes a graphic controller 41 for controlling the entire display unit 40 on the basis of the control data transmitted from the CPU 22 via the bus line 30, a buffer memory 42 having a memory such as a VRAM (Video RAM) for temporarily storing immediately displayable image information, a display control unit 43 for controlling a display 44 such as a liquid crystal and a CRT (Cathode Ray Tube) on the basis of the image data outputted from the graphic controller 41, and the display 44. The display 44 is formed by a liquid crystal display device of the opposite angle 5-10 inches, and is mounted in the vicinity of a front panel of the vehicle.

The sound output unit 50 includes a D/A converter 51 for executing D/A (Digital to Analog) conversion of the sound digital data transmitted from the disc drive 31 or the RAM 24 via the bus line 30 under the control of the system controller 20, an amplifier (AMP) 52 for amplifying a sound analog signal outputted from the D/A converter 51, and a speaker 53 for converting the amplified sound analog signal into the sound and outputting it to the vehicle compartment.

The input device 60 includes keys, switches, buttons, a remote controller and a sound input device, which are used for inputting various kinds of commands and data. The input device 60 is arranged in the vicinity of the display 44 and a front panel of a main body of an on-vehicle electric system loaded on the vehicle. Additionally, in such a case that the display 44 is in a touch panel system, a touch panel provided on the display screen of the display 44 also functions as the input device 60.

(3) Configuration of Head-Up Display

Figure 3:
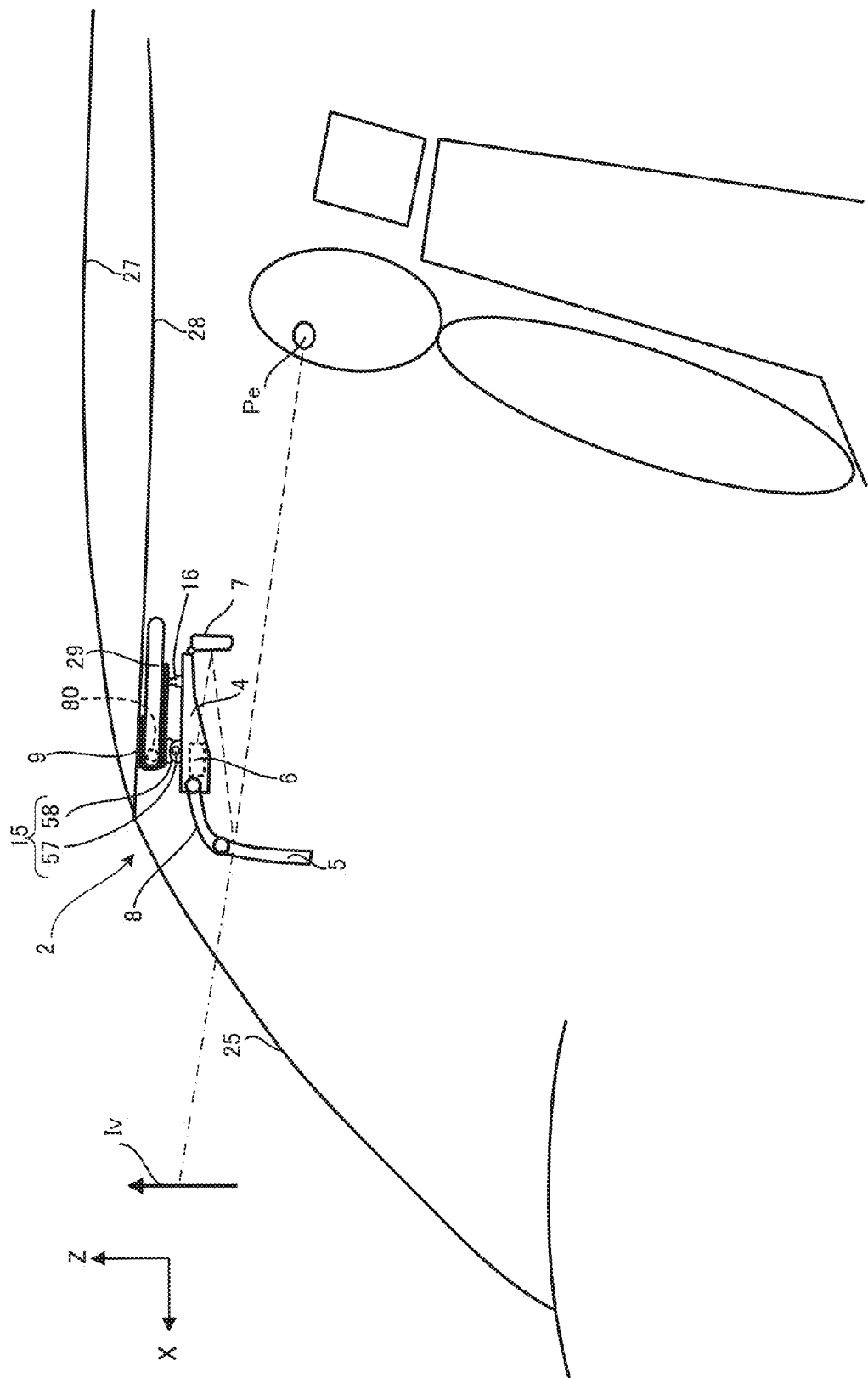
FIG. 3 schematically illustrates a head-up display installed on the interior of a vehicle.

FIG. 3 schematically illustrates the head-up display 2 installed on the interior of the vehicle. FIG. 3 is a side view of the driving seat in a vehicle and the driver sits on the seat in the vehicle. Over the head of the driver, there is provided a roof (plate) 27 which constitutes the outline of the vehicle. Under the roof 27, there is provided a ceiling board 28 which constitutes the inner decoration of the vehicle. In front of the driver, there is provided a front window 25 and a sun visor 29 of the vehicle. In the case of FIG. 3, the sun visor 29 is fixed in such a state (referred to as "storage state") that the sun visor 29 faces the ceiling board 28. The sun visor 29 can rotate on the sun visor supporting shaft 80 that functions as a rotation axis in a direction in which the sun visor 29 opens and closes with respect to the front window 25. Hereinafter, the X-axis direction indicates the short direction of the sun visor 29 in the storage state, the Y-axis direction indicates the longitudinal direction of the sun visor 29 in the storage state, and the Z-axis direction indicates the direction perpendicular both to the X-axis and to the Y-axis. Each positive direction of these axes is determined as illustrated in the drawings.

The head-up display 2 is provided in a diagonally upper forward direction with respect to the driver. The head-up display 2 mainly includes a main unit 4 which houses the light source unit 6, a combiner 5, a screen unit 7, connecting members 8, an attachment unit 9, a joint member 15 and a damper 16.

The light source unit 6, which is housed in the main unit 4, projects onto the screen unit 7 the light which constitutes an intermediate image indicating information to be seen by the observer. The concrete configuration of the light source unit 6 will be described later with reference to FIG. 5.

The combiner 5 is an optical element onto which the light of the intermediate image generated by the screen unit 7 is projected and which reflects a part of the projected light to the eye point "Pe" of the driver to let the driver see the virtual image Iv. It is noted that the arrow is directed to the upper direction of the virtual image Iv. The surface of the combiner 5 for reflecting the display light is formed into a substantially concave shape. Thereby, the combiner 5 enlarges the display size of the virtual image Iv. The combiner 5 is an example of "the half mirror" according to the present invention.

The connecting members 8 extend towards the front window 25 in order to sandwich and hold the combiner 5. An example of the connecting members 8 is a pair of arms, and one side of the edges of the connecting members 8 are attached to both side surfaces of the main unit 4 while the other edges of the connecting members 8 on the opposite side sandwich and hold the combiner 5.

The screen unit 7 is a reflective optical member which generates the intermediate image and functions as an exit pupil expander (EPE). For example, on the surface of the screen unit 7 which the light emitted from the light source unit 6 enters, there is provided microlens array formed by plural arranged microlenses, and the surface opposite to the microlens array functions as a reflection surface. In another example of the screen unit 7, the screen unit 7 may be a transmission-type optical member instead of a reflective optical member according to the embodiment. Even in this case, the screen unit 7 has a microlens array formed by plural arranged microlenses and functions as an exit pupil expander of the light projected from the light source unit 6 thereby to emit the light for displaying an image towards the combiner 5.

The attachment unit 9 is attached to the joint member 15 and the damper 16 which are provided on the top surface of the main unit 4 facing the ceiling board 28, and fixes the main unit 4 to the sun visor 29 by sandwiching and holding the sun visor 29. The attachment unit 9 is a plate elastic body bent in a state that the cross-section surface is shaped into like a J character. The attachment unit 9 has elastic force applied towards the direction that the sun visor 29 is sandwiched. The attachment unit 9 is an example of "the attachment member" and "the attachment device" according to the present invention.

The joint member 15 is provided between the main unit 4 and the attachment unit 9, and supports the main unit 4 such that the main unit 4 can rotate with respect to the attachment unit 9. The joint member 15 includes a rotation shaft 57 and a shaft bearing 58 which functions as a bearing of the rotation shaft 57. The rotation shaft 57 is substantially parallel to the sun visor supporting shaft 80 and holds the main unit 4 such that the main unit 4 can rotate with respect to the attachment unit 9. Namely, the rotational direction of the main unit 4 on the rotation shaft 57 coincides with the pitch direction (simply referred to as "pitch direction Pv") of the vehicle Ve and is the same as the rotational direction of the sun visor 29 on the sun visor supporting shaft 80. The rotational motion of the main unit 4 around the rotation shaft 57 is restricted by the damper 16. The rotation shaft 57 is an example of "the joint shaft" according to the present invention.

The damper 16 is provided between the main unit 4 and the attachment unit 9 in the same way as the joint member 15, and lies nearer to the screen unit 7 than the joint member 15. The damper 16 reduces the vibration of the main unit 4 in the pitch direction Pv that indicates the rotational direction around the rotation shaft 57. The damper 16 absorbs the vibration (i.e., non-stationary displacement in the pitch direction Pv) thereby to suppress the main unit 4 from vibrating in the pitch direction Pv. The damper 16 is an example of "the buffer member" according to the present invention.

Figure 4:
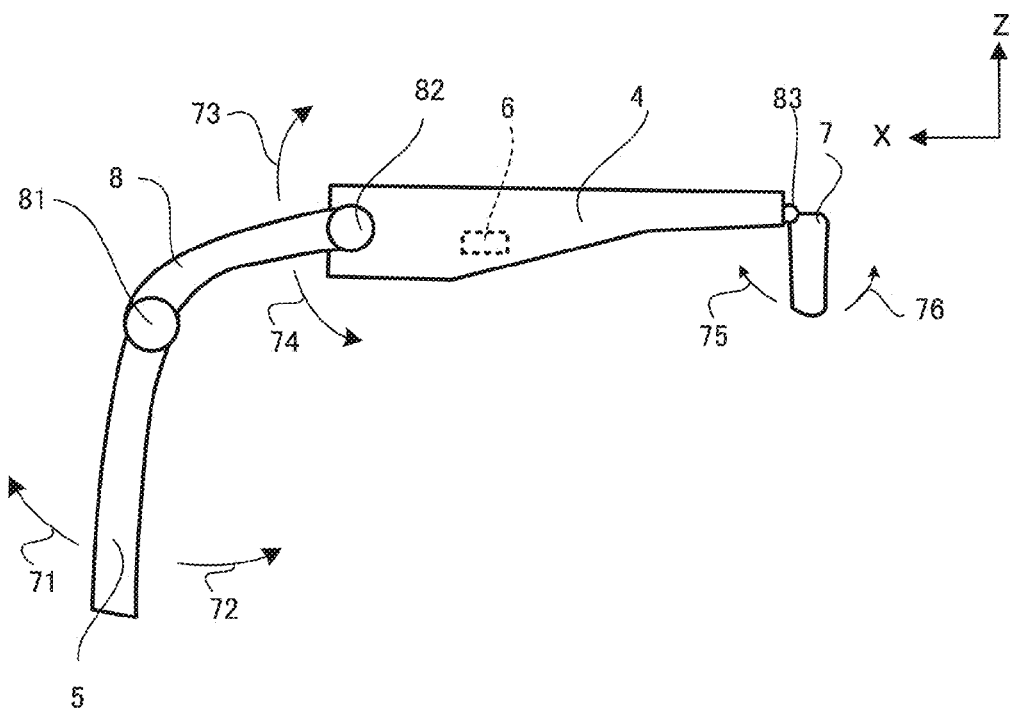
FIG. 4 illustrates a side view of the head-up display.

Additionally, each of the combiner 5, the connecting members 8 and the screen unit 7 is configured such that the angle (i.e., tilt) thereof in the fixed state is adjustable. FIG. 4 illustrates a side view of the head-up display 2. For the sake of explanation, FIG. 4 does not illustrate the attachment unit 9.

As illustrated in FIG. 4, the combiner 5 is free to rotate on the first adjustment part 81 in the both directions indicated by the arrow 71 and the arrow 72 along the X-Z plane, wherein the first adjustment part 81 is provided at ends of the connecting members 8. The connecting members 8 are free to rotate on the second adjustment part 82 in the both directions indicated by the arrow 73 and the arrow 74 along the X-Z plane, wherein the second adjustment part 82 is provided at the forward portion of the main unit 4. Furthermore, the screen unit 7 is free to rotate on the third adjustment part 83 in the both directions indicated by the arrow 75 and the arrow 76, wherein the third adjustment part 83 is provided at the posterior end of the main unit 4. Each of the combiner 5, the connecting members 8 and the screen unit 7 is sustained at any angle after the rotation.

(4) Configuration of Light Source Unit

Figure 5:
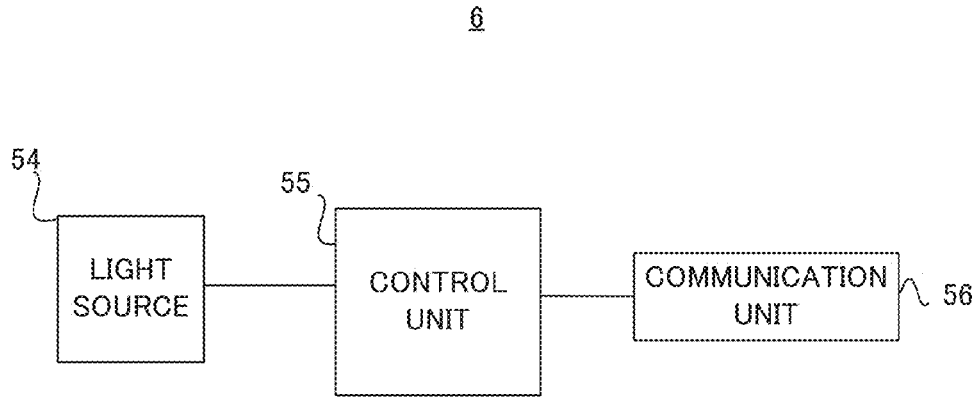
FIG. 5 is schematically illustrates the configuration of a light source unit.

FIG. 5 schematically illustrates the configuration of the light source unit 6. As illustrated in FIG. 5, the light source unit 6 includes a light source 54, a control unit 55 and a communication unit 56.

The light source 54 includes laser light sources corresponding to red, blue and green, and projects the light (referred to as "display light") for displaying an image onto the combiner 5 under the control of the control unit 55. The light source 54 is an example of "the projection unit" according to the present invention. Under the control of the control unit 55, the communication unit 56 receives various kind of information used for navigation processing from the navigation device 1. For example, the communication unit 56 receives information on a guide route from the navigation device 1 when the destination is determined.

The control unit 55 includes a CPU, a ROM which stores control programs and data used by the CPU, and a RAM in which various kinds of data are sequentially read out and stored as a working memory, and performs a general control of the head-up display 2. For example, on the basis of the information on the guide route acquired from the navigation device 1, the control unit 55 lets the light source 54 emit the light for displaying the guide image thereby to display on the combiner 5 the guide image over the scenery in front of the driver.

[Vibration Suppression Function]

The head-up display 2 has a vibration suppression function to prevent the main unit 4 from vibrating in the pitch direction Pv in response to the vibration of the sun visor 29 in the pitch direction Pv. Thereby, it is possible to preferably suppress the display position of the virtual image Iv from intensively fluctuating even when the sun visor 29 vibrates in the pitch direction Pv.

(1) Vibration Suppression by Damper

Figure 6:
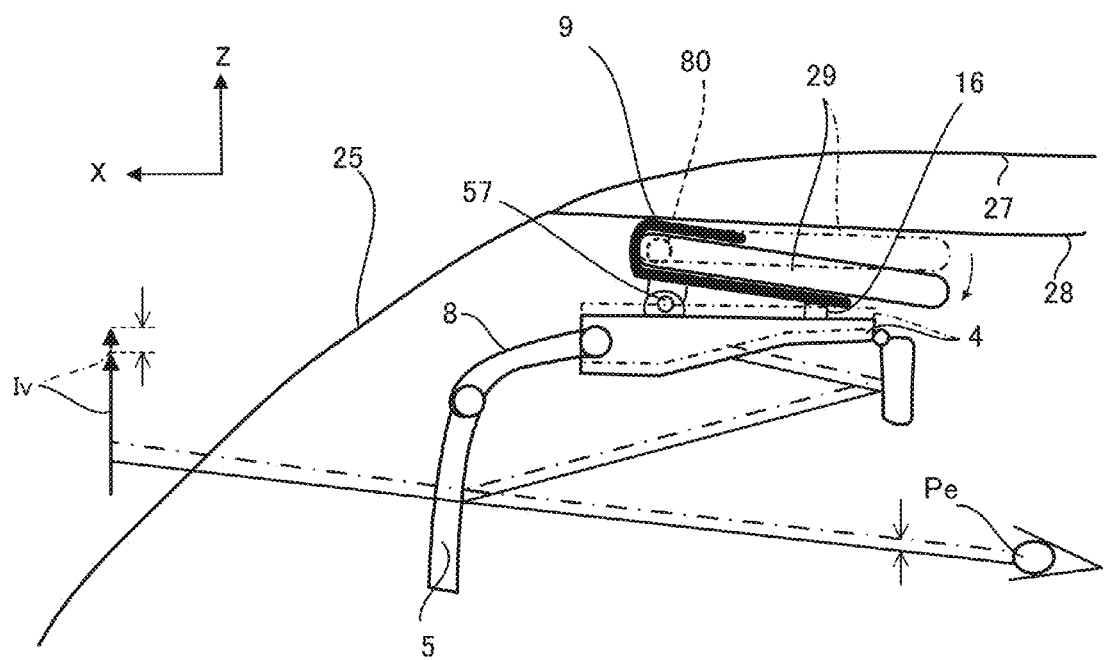
FIG. 6 illustrates a side view of the head-up display before and after the vehicle vibrates up and down.

The damper 16 suppresses the main unit 4 from vibrating in the pitch direction Pv by absorbing the vibration of the sun visor 29 in the pitch direction Pv. The explanation thereof will be given with reference to FIG. 6. FIG. 6 illustrates a side view of the head-up display 2 before and after the vehicle Ve vibrates up and down. In FIG. 6, the main unit 4, the sun visor 29 and the principal ray of the display light before the vibration of the vehicle Ve are indicated by the alternate long and short dash lines.

When the vehicle Ve vibrates up and down (i.e., in the Z-axis direction), the sun visor 29 not only vibrates up and down with substantially the same amplitude as the vibration of the vehicle Ve but also vibrates in the pitch direction Pv which is equal to the rotational direction around the sun visor supporting shaft 80. In this case, the damper 16 expands and contracts to absorb the vibration of the sun visor 29 in the pitch direction Pv through the inertia of the main unit 4. Thus, the main unit 4 does not respond to the vibration of the sun visor 29 in the pitch direction Pv and therefore the vibration in the pitch direction Pv is suppressed. In contrast, the main unit 4 vibrates up and down in response to the up-and-down vibration of the sun visor 29. As a result, according to the example illustrated by FIG. 6, the virtual image Iv is displaced up and down with substantially the same amplitude as the up-and-down vibration of the sun visor 29.

If the head-up display 2 does not have any function to absorb the vibration of the sun visor 29 in the pitch direction Pv, the main unit 4 vibrates in the pitch direction Pv in response to the sun visor 29. In this case, due to the change of the tilt of the combiner 5, the virtual image Iv fluctuates within the range in proportion to amplitude of the vibration in the pitch direction Pv and the distance between the eye point Pe and the virtual image Iv. Since the head-up display 2 displays the virtual image Iv to be seen far from the combiner 5, the distance between the eye point Pe and the virtual image Iv is longer than the distance between the eye point Pe and the combiner 5. Thus, even a small change of the angle in the pitch direction Pv could lead to a great change of the position of the virtual image Iv. Thus, in this case, the amplitude of the vibration of the display position of the virtual image Iv becomes larger than the amplitude of the vibration of the vehicle Ve, which could lead to deterioration of the visibility.

Above things considered, the head-up display 2 has the rotation shaft 57 substantially parallel to the sun visor supporting shaft 80 and the damper 16 configured to reduce the vibration of the main unit 4 in the rotational direction around the rotation shaft 57. Thereby, the head-up display 2 absorbs the vibration of the sun visor 29 in the pitch direction Pv. In this configuration, the virtual image Iv vibrates up and down with the amplitude of the up-and-down vibration of the vehicle Ve (i.e., the amplitude of the up-and-down vibration of the eye point Pe). Thus, in this case, the head-up display 2 can prevent the virtual image Iv from vibrating based on the overreaction to the vibration of the vehicle Ve, and therefore can preferably make the driver visually recognize the virtual image Iv.

In contrast, the head-up display 2 has the main unit 4 tilted in response to the stationary tilt of the vehicle Ve and the sun visor 29 (i.e., displacement at low frequencies in the pitch direction Pv) without absorbing it. The description thereof will be given with reference to FIG. 7.

Figure 7:
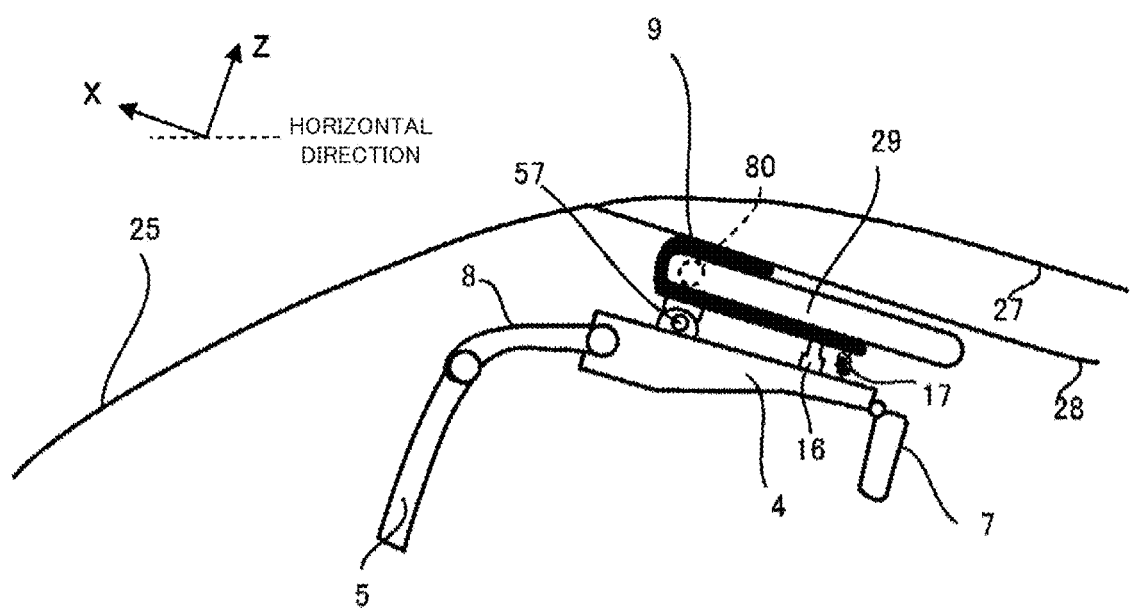
FIG. 7 illustrates a side view of the head-up display in a case where the vehicle is running on an uphill road.

FIG. 7 illustrates a side view of the head-up display 2 in a case where the vehicle Ve is running on an uphill road. In the case of FIG. 7, in accordance with the gradient of the road, the vehicle Ve and the sun visor 29 are inclined toward the pitch direction Pv against the horizontal direction. In this case, along with the inclination of the sun visor 29 toward the pitch direction Pv, the main unit 4 is inclined toward the pitch direction Pv by the gradient of the road. Namely, since the damper 16 does not shrink in this case, the main unit 4 is inclined toward the pitch direction Pv along with the sun visor 29. Thereby, the virtual image Iv is displayed in such a state that the virtual image Iv is inclined toward the pitch direction Pv by the gradient of the vehicle Ve. Accordingly, in this case, the driver can preferably see the virtual image Iv without adjusting the direction of the eyes.

Preferably, the head-up display 2 has the spring 17 in addition to the damper 16 as illustrated in FIG. 7. Without the spring 17, it would become difficult for the damper 16 alone to follow the stationary gradient of the sun visor 29. As a result, the gradient of the main unit 4 would not match the stationary gradient of the sun visor 29. The spring 17 supplements the function of the damper 16 to preferably make the inclination of the main unit 4 follow the stationary inclination of the sun visor 29. The pair of the damper 16 and the spring 17 functions as a so-called suspension. In the case of FIG. 7, the damper 16 and the spring 17 function as "the buffer member" according to the present invention.

(2) Vibration Suppression Based on Position of Rotation Shaft

Figure 8:
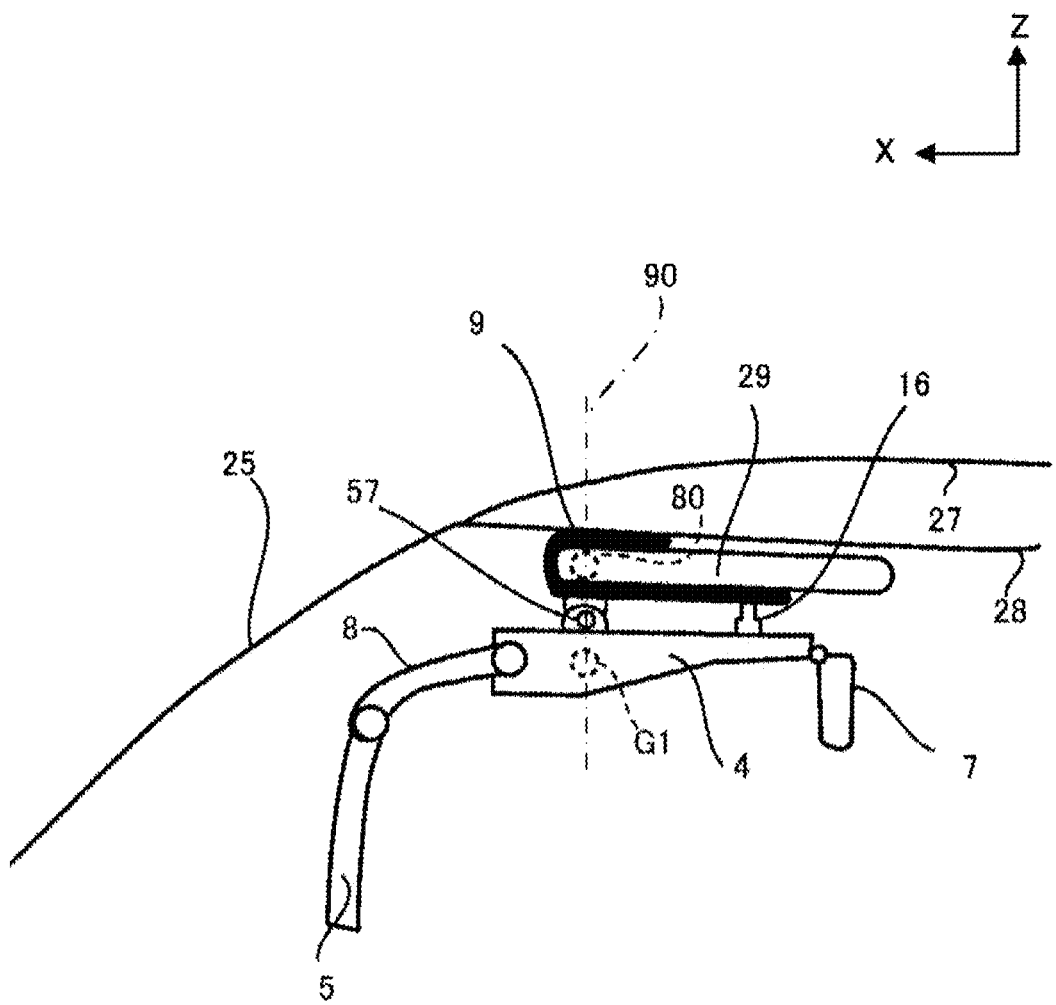
FIG. 8 illustrates a side view of the head-up display.

Next, a description will be given of the position of the rotation shaft 57 of the joint member 15. The rotation shaft 57 is provided at such a position that the vibration of the main unit 4 and the sun visor 29 in the pitch direction Pv caused by the weight of the main unit 4 can be suppressed. FIG. 8 illustrates a side view of the head-up display 2. For the sake of explanation, FIG. 8 illustrates the position "G1" of the center of gravity of the main unit 4.

In the case of FIG. 8, the rotation shaft 57 exists in the substantially vertical direction with respect to the sun visor supporting shaft 80, i.e., at such a position that the moment of rotation (i.e., torque) of the sun visor 29 around the sun visor supporting shaft 80 generated by the weight of the main unit 4 becomes minimal. The position G1 of the center of the gravity exists in the vertical direction with respect to the rotation shaft 57, i.e., at such a position that the torque of the main unit 4 around the rotation shaft 57 generated by the weight of the main unit 4 is minimal. As a result, in the case of FIG. 8, the sun visor supporting shaft 80, the rotation shaft 57 and the position G1 of the center of the gravity of the main unit 4 are on the alternate long and short dash line

90 extending in the vertical direction, respectively. In other words, the sun visor supporting shaft 80, the rotation shaft 57 and the position G1 of the center of the gravity of the main unit 4 overlap with each other in the horizontal direction.

Generally, as the distance in the horizontal direction between the rotation shaft 57 and the sun visor supporting shaft 80 is short, the torque around the sun visor supporting shaft 80 generated by the weight of the main unit 4 becomes small and therefore the amplitude of the vibration of the sun visor 29 in the pitch direction Pv becomes small. In the case of FIG. 8, the distance in the horizontal direction between the rotation shaft 57 and the sun visor supporting shaft 80 is minimal (i.e., 0). Thus, in this case, it is possible to preferably suppress the vibration of the sun visor 29 in the pitch direction Pv due to the weight of the main unit 4.

In the same way, as the distance in the horizontal direction between the rotation shaft 57 and the position G1 of the center of the gravity of the main unit 4 is short, the torque around the rotation shaft 57 generated by the weight of the main unit 4 becomes small and therefore the amplitude of the vibration of the main unit 4 with respect to the sun visor 29 in the pitch direction Pv becomes small. In the case of FIG. 8, the distance in the horizontal direction between the rotation shaft 57 and the position G1 of the center of the gravity of the main unit 4 is minimal. Thus, in this case, it is possible to preferably suppress the vibration of the main unit 4 with respect to the sun visor 29 in the pitch direction Pv due to the weight of the main unit 4.

(3) Vibration Suppression Based on Sandwich Width of Attachment Unit

Next, a description will be given of the width (referred to as "sandwich width Lw") of the attachment unit 9 in the longitudinal direction (i.e., Y-axis direction) of the sun visor 29. Preferably, the sandwich width Lw is determined to such a length that the resonance frequency of the sun visor 29 at the time when the attachment unit 9 is attached to the sun visor 29 is equal to or higher than a predetermined frequency (e.g., 45 Hz). This makes it possible to preferably reduce the fluctuation of the virtual image Iv.

Figure 9A:
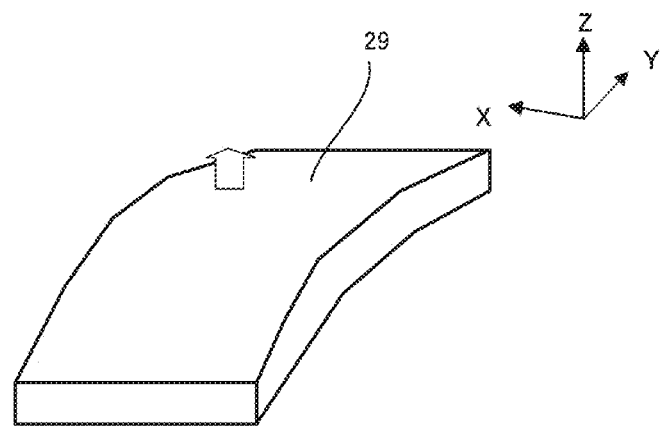
FIGS. 9A and 9B illustrate a sun visor bending in the longitudinal direction due to vibration of the vehicle.
Figure 9B:
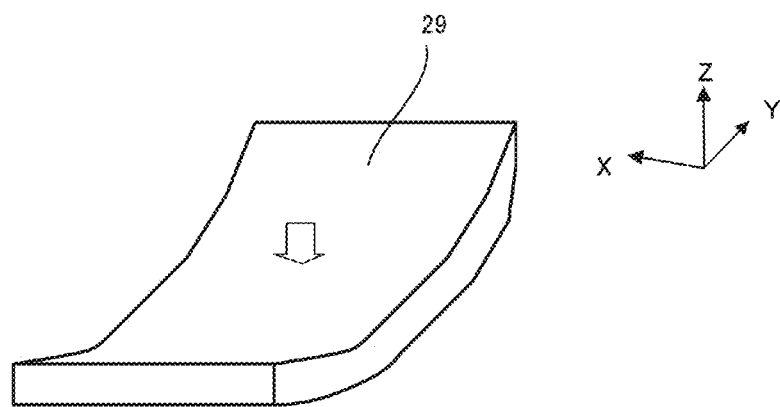

FIGS. 9A and 9B illustrate the sun visor 29 bending in the longitudinal direction due to the vibration of the vehicle Ve. The sun visor 29 is an elastic body and therefore alternates between the state as illustrated in FIG. 9A and the state as illustrated in FIG. 9B in addition to the vibration in the rotational direction on the sun visor supporting shaft 80. The resonance frequency of the sun visor 29 in this case depends on the type of the sun visor 29 (i.e., the type of the vehicle Ve). When the resonance frequency of the sun visor 29 is equal to or lower than a predetermined frequency (referred to as "criterion frequency"), the virtual image Iv displayed by the head-up display 2 attached to the sun visor 29 remarkably vibrates. The criterion frequency is 30 Hz, for example.

Above things considered, according to the embodiment, when the attachment unit 9 is attached to the sun visor 29, the stiffness of the sun visor 29 is reinforced with the attachment unit 9 and therefore the resonance frequency of the sun visor 29 increases beyond the criterion frequency. Thereby, it is possible to preferably increase the resonance frequency. The description thereof will be given with reference to FIGS. 10A and 10B.

Figure 10A:
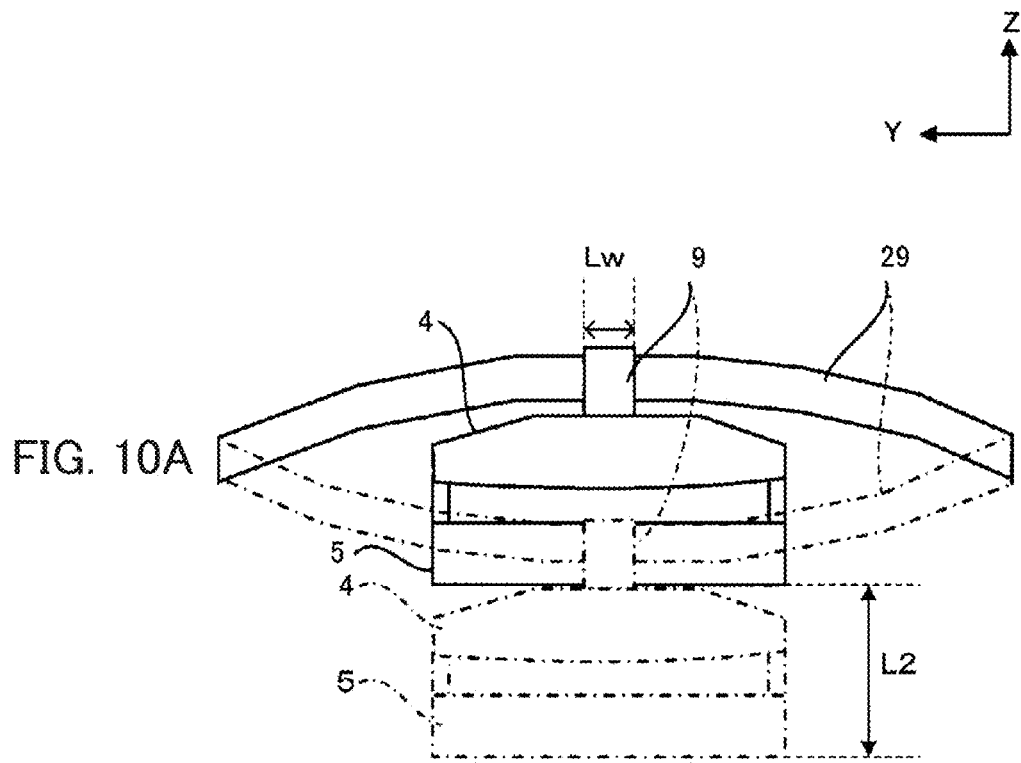
FIG. 10A illustrates a front view of the head-up display in a case that the sandwich width is relatively short.

FIG. 10A illustrates a front view of the head-up display 2 in a case that the sandwich width Lw is relatively short. In the case of FIG. 10A, since the sandwich width Lw is relatively short, the attachment unit 9 cannot sufficiently strengthen the stiffness of the sun visor 29. In this case, the resonance frequency of the sun visor 29 is equal to or smaller than the criterion frequency and therefore the amplitude of the vibration of the sun visor 29 in the Z-axis direction is large. As a result, the combiner 5 vibrates in the Z-axis direction with the amplitude illustrated by the arrow L2. Accordingly, the virtual image Iv also shakes violently in the Z-axis direction.

Figure 10B:
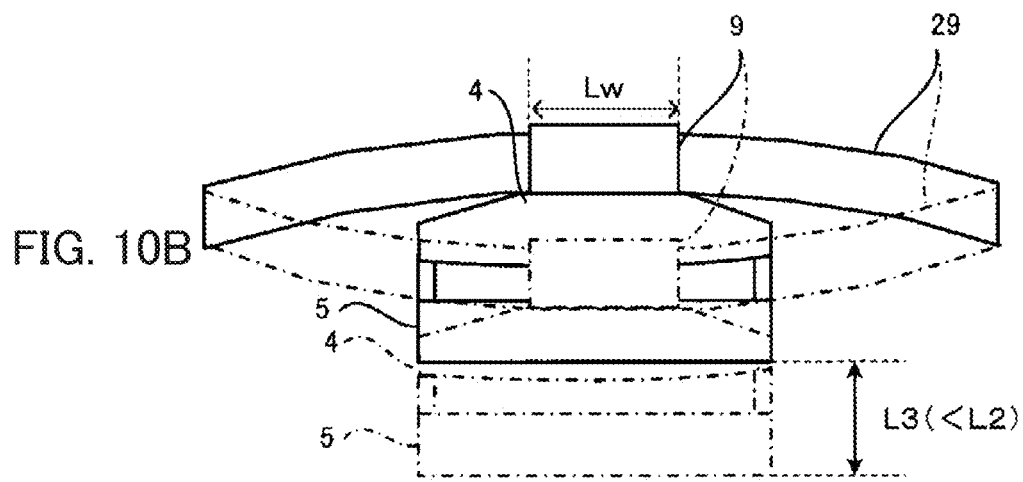
FIG. 10B illustrates a front view of the head-up display in a case that the sandwich width is equal to or longer than a predetermined length.

FIG. 10B illustrates a front view of the head-up display 2 in a case where the sandwich width Lw is determined to a length (e.g., over 10 cm) capable of preferably reinforcing the stiffness of the sun visor 29. In the case of FIG. 10B, the attachment unit 9 preferably reinforces the stiffness of the sun visor 29 to suppress the sun visor 29 from bending in the longitudinal direction. Thus, in this case, the resonance frequency of the sun visor 29 becomes equal to or larger than the criterion frequency and therefore the amplitude of the vibration of the sun visor 29 in the Z-axis direction becomes smaller than the amplitude in the case of FIG. 10A. As a result, the combiner 5 vibrates in the Z-axis direction with the amplitude indicated by the arrow L3 that is shorter than the arrow L2, and the fluctuation of the virtual image Iv in the Z-axis direction is also suppressed.

As mentioned above, the head-up display 2 makes an observer visually recognize an image, which is optically reflected by a combiner, as a virtual image. The head-up display 2 has a main body unit 4 and an attaching unit 9. The main unit 4 has a light source 54 which is a projection unit for projecting the image. The attachment unit 9 is configured such that the attachment unit 9 can be attached to a sun visor 29 that is installed in a vehicle Ve. The joint member 15 has a rotation shaft 57 that rotatably joints the main unit 4 to the attachment unit 9. The damper 16 reduces vibration of the main unit 4 in the rotational direction around the rotation shaft 57. When the attachment unit 9 is attached to the sun visor 29, the rotation shaft 57 of the joint member 15 is substantially parallel to a sun visor supporting shaft 80. The sun visor supporting shaft 80 supports the sun visor 29 such that the sun visor 29 can rotate in the direction in which the sun visor 29 opens and closes with respect to a front window 25. According to such a configuration, the head-up display 2 can preferably suppress the main unit 4 from vibrating in the pitch direction Pv along with the sun visor 29 due to the vibration of the vehicle Ve thereby to reduce the fluctuation of the virtual image Iv.

It is noted that the rotation shaft 57 does not have to be strictly parallel to the sun visor supporting shaft 80. The rotation shaft 57 may be substantially parallel to the sun visor supporting shaft 80. Namely, the rotation shaft 57 may deviate from a parallel position to the sun visor supporting shaft 80 within such a range that each function of the head-up display 2 explained in the above embodiment can be achieved. Even in this case, the head-up display 2 can also suppress the vibration of the main unit 4 in the pitch direction Pv along with the sun visor 29 due to the vibration of the vehicle Ve to reduce the fluctuation of the virtual image Iv.

[Modifications]

Hereinafter, preferred modifications of the above-mentioned embodiment will be described below. Each modification mentioned later can be applied to the above-mentioned embodiment in combination.

(First Modification)

According to the above embodiment, the head-up display 2 includes the combiner 5, and lets the driver see the virtual image Iv based on the light emitted from the light source unit 6 and reflected by the combiner 5. However, the configuration to which the present invention can be applied is not limited to the configuration. Instead, without the connecting member 8 and the combiner 5, the head-up display 2 may let the driver see the virtual image Iv based on the light emitted from the light source unit 6 and reflected by the front window 25.

Figure 11:
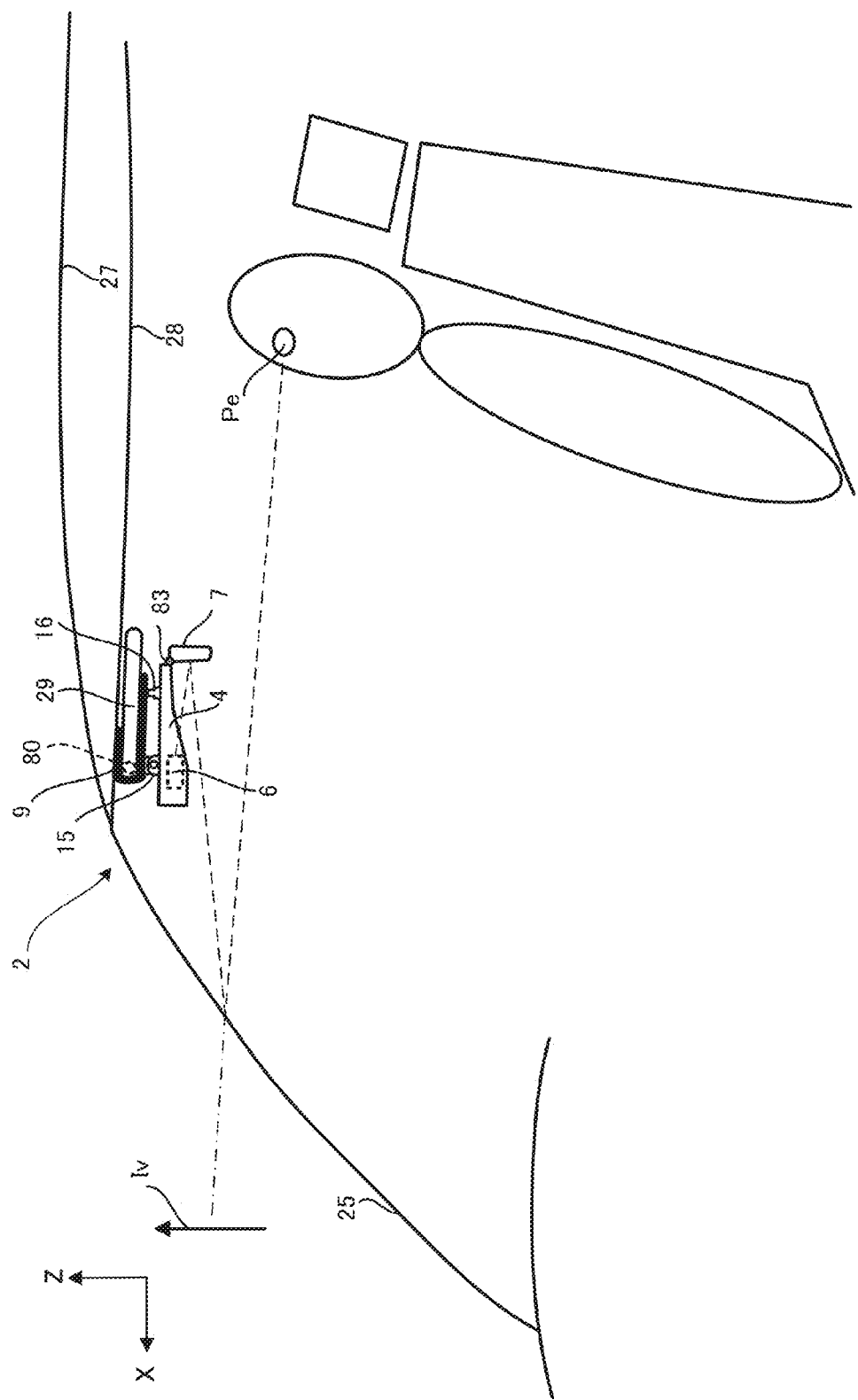
FIG. 11 illustrates an example of the configuration of the head-up display according to a modification.

FIG. 11 illustrates an example of the configuration of the head-up display 2 according to this modification. As illustrated in FIG. 11, according to the modification, the light which is emitted from the light source unit 6 and reflected by the screen unit 7 reaches the eye point Pe after the reflection by the front window 25. Even in this case, by having the configuration mentioned in the section "Vibration Suppression Function", the head-up display 2 can preferably reduce the fluctuation of the virtual image Iv due to the vibration of the sun visor 29 in the pitch direction Pv in the same way as the above embodiment.

(Second Modification)

On the attachment unit 9, there may be provided a member which makes contact with the ceiling board 28 around the forward portion of the sun visor 29 in the storage state to restrict the rotation of the sun visor 29 in the pitch direction Pv.

Figure 12A:
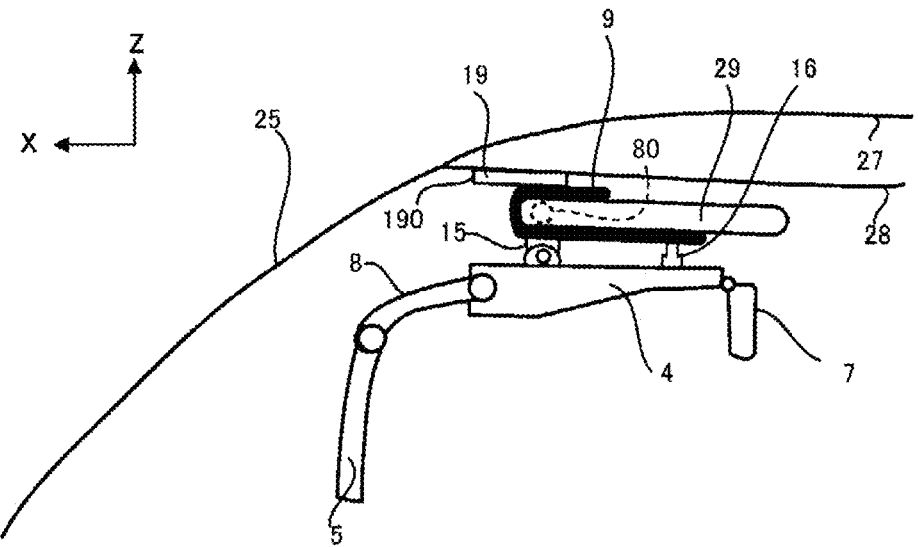
FIGS. 12A and 12B illustrate a side view of the head-up display according to a modification.

FIG. 12A illustrates a side view of the head-up display 2 according to the modification. As illustrated in FIG. 12A, on the surface of the attachment unit 9 facing the ceiling board 28, there is provided an arm 19 having a plate shape. The arm 19 is attached to the ceiling board 28 and extends from above the attachment unit 9 toward the positive X-axis direction. Thus, in the case of FIG. 12A, the attachment unit 9 is fixed to the ceiling board 28 through the arm 19.

In the state of FIG. 12A, the arm 19 sticks out with respect to the sun visor supporting shaft 80 to the direction (i.e., positive X-axis direction) of the front window 25 along the ceiling board 28 and therefore restricts the rotation of the sun visor 29 toward the front window 25. Thus, the arm 19 preferably suppresses the sun visor 29 from vibrating in the pitch direction Pv and reduces the fluctuation of the virtual image Iv.

Figure 12B:
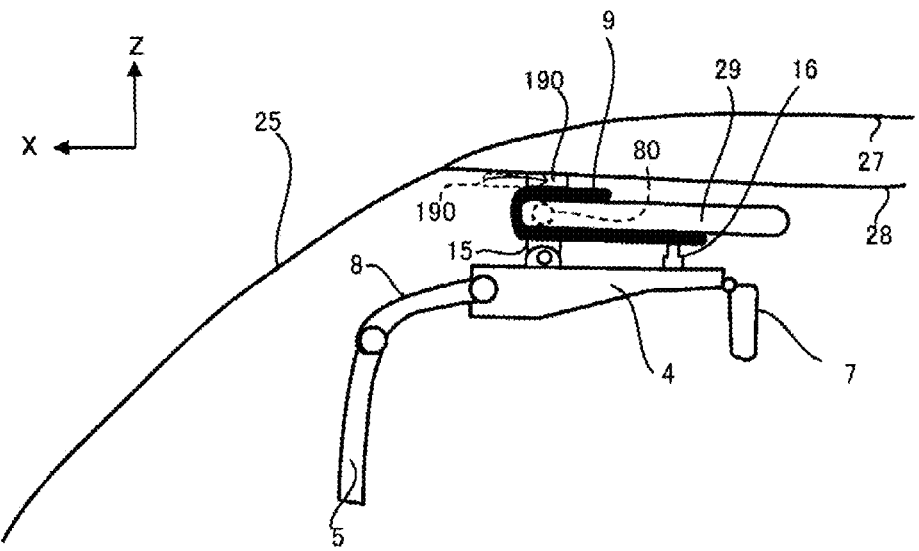
Figure 13:
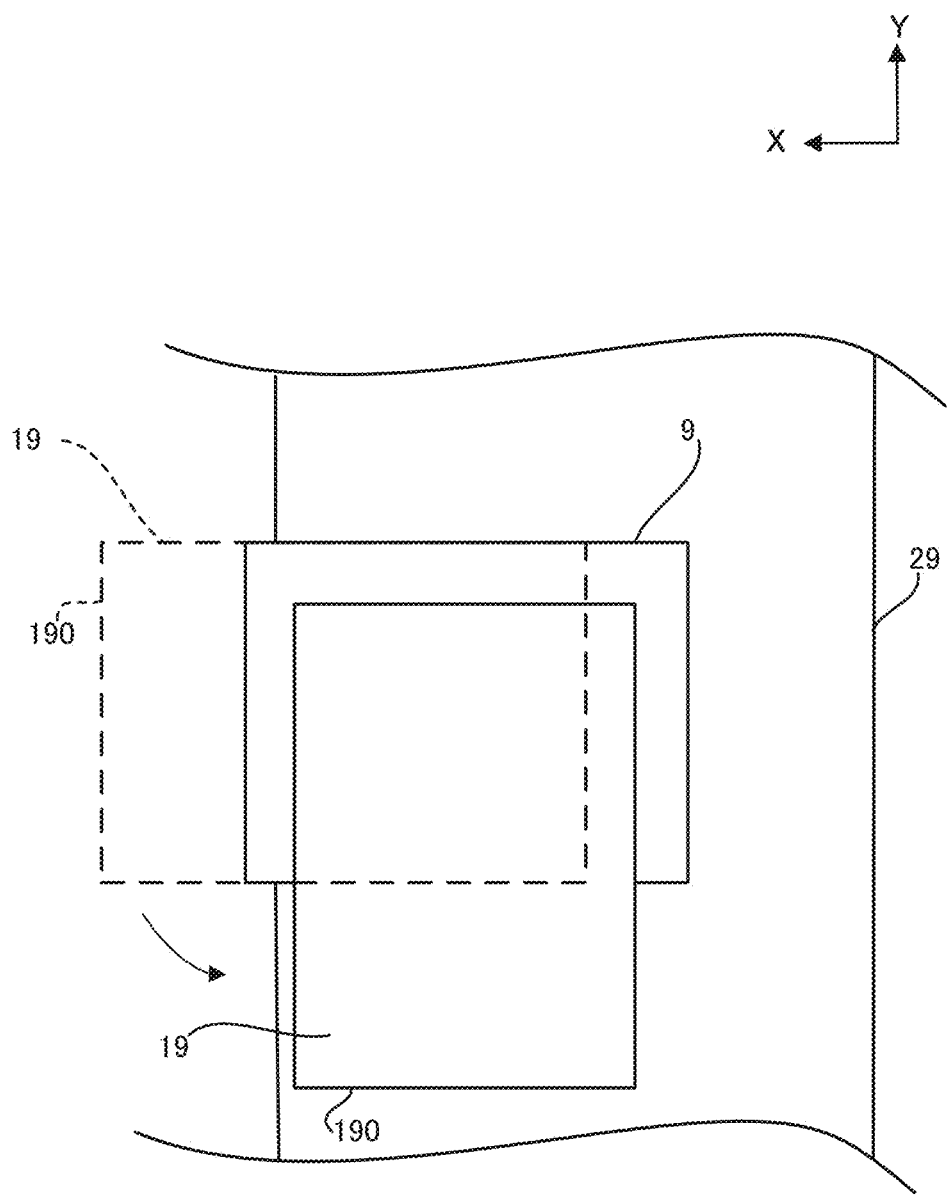
FIG. 13 illustrates a top view of an arm and an attachment unit.

The arm 19 can rotate on the Z-axis so that the side surface 190 facing the front window 25 in FIG. 12A is directed to the Y-axis direction (i.e., side direction of the vehicle Ve). FIG. 12B illustrates a side view of the head-up display 2 after the arm 19 is rotated on the Z-axis along the ceiling board 28 by approximately 90 degree. FIG. 13 illustrates a top view of the arm 19 and the attachment unit 9. In FIG. 13, the arm 19 in the state illustrated in FIG. 12B is indicated by the solid line and the arm 19 in the state illustrated in FIG. 12A is indicated by the dashed line.

In the example illustrated in FIG. 12A and FIG. 13, the arm 19 is rotated on the Z-axis along the ceiling board 28 by approximately 90 degree so that the side surface 190 is directed to the negative Y-axis direction. As a result, the edge of the arm 19 including the side surface 190 does not stick out with respect to the sun visor supporting shaft 80 toward the positive X-axis direction. Thus, in this case, the arm 19 does not restrict the sun visor 29 from rotating toward the front window 25. Thereby, the user can rotate the sun visor 29 toward the front window 25 and preferably use it.

Instead of the example illustrated in FIGS. 12B and 13, the arm 19 may be extendable so that the arm 19 can alternate between the state that the arm 19 sticks out with respect to the sun visor supporting shaft 80 to the positive X-axis direction and the state that the arm 19 does not stick out with respect to the sun visor supporting shaft 80 to the positive X-axis direction. In the case of FIG. 12A, for example, the edge part of the arm 19 which sticks out with respect to the sun visor supporting shaft 80 to the positive X-axis direction is configured to be slidable in the negative X-axis direction without changing the relative position between the ceiling board 28 and the attachment unit 9. When the above-mentioned edge part of the arm 19 is shifted to the negative X-axis direction, the arm 19 does not stick out with respect to the sun visor supporting shaft 80 to the positive X-axis direction and therefore does not restrict the sun visor 29 from rotating toward the front window 25. Thus, even in this configuration, in the same way as the example illustrated in FIGS. 12B and 13, the user can rotate the sun visor 29 toward the front window 25 and preferably use it.

(Third Modification)

The attachment unit 9 is not limited to be used for attaching the main unit 4 of the head-up display 2 to the sun visor 29. Instead, the attachment unit 9 may be used for attaching a display such as a liquid crystal display to a sun visor which is provided on the side of the passenger seat. Even in this case, the attachment unit 9 is connected to the display through the joint member 15 and the damper 16, and fixes the display to the sun visor 29. Thereby, as in the case where the main unit 4 is attached to the sun visor 29, the attachment unit 9 can preferably suppress the vibration of the screen of the display due to the vibration of the sun visor 29 in the pitch direction Pv.

BRIEF DESCRIPTION OF REFERENCE NUMBERS

1 Navigation device
2 Head-up display
4 Main unit
5 Combiner
6 Light source unit
8 Connecting member
9 Attachment unit
15 Joint member
16 Damper
25 Front window
100 Display system

The invention claimed is:

1. A virtual image display device used while being attached to a sun visor of a moving body, the virtual image display device being configured to make an observer visually recognize a display image as a virtual image, the display image being optically reflected by a half mirror, the virtual image display device comprising:
   a main unit configured to include a projection unit for projecting the display image; and
   a buffer member configured to reduce vibration of the main unit in rotational direction of the sun visor.

2. The virtual image display device according to claim 1, further comprising:
   an attachment member configured to be attachable to the sun visor; and
   a joint member configured to include a joint shaft which rotatably joints the main unit to the attachment member,
   wherein the buffer member is configured to reduce vibration of the main unit in rotational direction of the joint shaft.

3. The virtual image display device according to claim 2, wherein the joint shaft is substantially parallel to a sun visor shaft in a state that the attachment member is attached to the sun visor, the sun visor shaft supporting the sun visor in a state that the sun visor can rotate in direction in which the sun visor opens and closes with respect to a front window of the moving body.

4. The virtual image display device according to claim 3, wherein the joint shaft exists near the sun visor shaft.

5. The virtual image display device according to claim 4, wherein the joint shaft exists in a substantially vertical direction with respect to the sun visor shaft, and
wherein a center of gravity of the main unit exists in a substantially vertical direction with respect to the joint shaft.

6. The virtual image display device according to claim 3, wherein a center of gravity of the main unit exists near the joint shaft.

7. The virtual image display device according to claim 3, wherein the attachment member sandwiches the sun visor in order to be attached thereto, and
wherein width of the attachment member sandwiching the sun visor in a longitudinal direction of the sun visor is determined to such a length that resonance frequency of the sun visor is equal to or higher than a predetermined frequency.

8. The virtual image display device according to claim 3, further comprising
a restriction member configured to restrict the sun visor from rotating on the sun visor shaft in a state that the sun visor is closed.

9. The virtual image display device according to claim 8, wherein the restriction member is provided between the attachment member and a target unit of attachment installed in the moving body, and
wherein the restriction member is an arm which sticks out with respect to the sun visor shaft to direction of the front window along the target unit.

10. The virtual image display device according to claim 9, wherein the arm is rotatable or extendable along the target unit not to stick out with respect to the sun visor shaft to the direction of the front window.

11. The virtual image display device according to claim 1, further comprising
a combiner configured to function as the half mirror.

12. An attachment device for attaching an object to a sun visor installed in a moving body, comprising
an attachment member configured to be attached to the sun visor of the moving body;
a joint member configured to include a joint shaft which rotatably joints the object to the attachment member; and
a buffer member configured to reduce vibration of the object in rotational direction of the joint shaft,
wherein the joint shaft of the joint member is substantially parallel to a sun visor shaft in a state that the attachment member is attached to the sun visor, the sun visor shaft supporting the sun visor in a state that the sun visor can rotate in direction in which the sun visor opens and closes with respect to a front window of the moving body.

* * * * *